US010120932B2

(12) United States Patent
Aitchison et al.

(10) Patent No.: US 10,120,932 B2
(45) Date of Patent: *Nov. 6, 2018

(54) SOCIAL CAPTURE RULES

(71) Applicant: ADOBE SYSTEMS INCORPORATED, San Jose, CA (US)

(72) Inventors: Cory William Aitchison, American Fork, UT (US); Mark Lanett, San Francisco, CA (US); Paul Jones, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 14/339,600

(22) Filed: Jul. 24, 2014

(65) Prior Publication Data

US 2016/0026687 A1    Jan. 28, 2016

(51) Int. Cl.
*G06F 17/30* (2006.01)
*G06Q 50/00* (2012.01)

(52) U.S. Cl.
CPC ....... *G06F 17/30654* (2013.01); *G06Q 50/01* (2013.01)

(58) Field of Classification Search
CPC ... H04L 51/32; H04L 67/22; G06F 17/30654; G06F 17/30979
See application file for complete search history.

(56) References Cited

U.S. PATENT DOCUMENTS

| 9,331,892 | B2 * | 5/2016 | Lindberg | H04L 41/00 |
| 2009/0119173 | A1 * | 5/2009 | Parsons | G06Q 10/107 |
| | | | | 705/319 |
| 2010/0005051 | A1 * | 1/2010 | Agrawal | G06N 5/022 |
| | | | | 706/55 |
| 2012/0144325 | A1 * | 6/2012 | Mital | G06F 9/4446 |
| | | | | 715/763 |
| 2014/0172751 | A1 * | 6/2014 | Greenwood | G06Q 50/01 |
| | | | | 705/36 R |
| 2014/0188459 | A1 * | 7/2014 | Fink | G06F 17/2785 |
| | | | | 704/9 |
| 2014/0207792 | A1 * | 7/2014 | Carasso | G06F 17/271 |
| | | | | 707/748 |
| 2014/0222913 | A1 * | 8/2014 | Cathcart | H04L 67/22 |
| | | | | 709/204 |
| 2015/0163321 | A1 * | 6/2015 | Abou Mahmoud | |
| | | | | G06F 17/3053 |
| | | | | 715/745 |

(Continued)

OTHER PUBLICATIONS

"Learning to Perform Moderation in Online Forums" Arnt et al.*
"Machine Learning in Automated Text Categorization" Sebastiani.*

*Primary Examiner* — Tarek Chbouki
(74) *Attorney, Agent, or Firm* — Shook, Hardy & Bacon (57) ABSTRACT

The collection of social data from social networking services for moderation purposes is improved by analyzing social mentions captured using an initial set of capture rules. The text and/or metadata of social mentions previously captured using an initial rule set of capture rules may be analyzed to identify common text and/or common metadata amongst those social mentions. A new rule set may be generated with capture rules having criteria selected based on the identified common text and/or common metadata. The new rule set may then be applied to capture new social data.

19 Claims, 4 Drawing Sheets

(56) References Cited

U.S. PATENT DOCUMENTS

| | | | |
|---|---|---|---|
| 2015/0194149 A1* | 7/2015 | Faizakof | G10L 15/1815 704/257 |
| 2015/0227579 A1* | 8/2015 | Cantarero | G06F 17/30616 707/708 |
| 2015/0234844 A1* | 8/2015 | Cardonha | G06F 17/30867 707/752 |
| 2015/0281156 A1* | 10/2015 | Beausoleil | H04L 51/14 709/206 |
| 2015/0281163 A1* | 10/2015 | Bastide | H04L 51/32 709/206 |
| 2016/0253710 A1* | 9/2016 | Publicover | H04W 4/21 705/14.66 |

* cited by examiner

SOCIAL CAPTURE RULES

BACKGROUND

Social networking has become an increasingly popular presence on the Internet. Social network services allow users to easily connect with friends, family members, and other users in order to share, among other things, comments regarding activities, interests, and other thoughts. As social networking has continued to grow, companies have recognized value in the technology. For instance, companies have found that social networking provides a great tool for managing their brand and driving consumers to their own web sites or to otherwise purchase their products or services. Companies can create their own social networking profiles for communicating with consumers via social networking posts and other messages. Additionally, since users often employ social networking to comment on products and services, companies can mine social data to identify what consumes are saying about the company, as well as its products, services, and industry in general. In some cases, companies may even choose to respond to consumers' comments on social networks.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention generally relate to improving the capture rules used by a social analysis tool to capture social data from social networks for moderation purposes (e.g., responding to social networking messages) by a company. Data regarding social mentions captured using an initial rule set of one or more capture rules may be analyzed to generate a new rule set. The new rule set may be generated by modifying the initial rule set (e.g., modifying existing capture rules, adding new capture rules, and/or removing existing capture rules) or replacing the initial rule set with an entirely new set of capture rules. Generating the new rule set may include analyzing the text and/or metadata of social mentions captured using the initial rule set to identify commonalities within the text and/or metadata. The analysis may also consider the capture rules of the initial rule set. The new rule set may be generated by selecting criteria based on the commonalities such that the criteria reflects text and/or metadata of social mentions likely to be of interest to the company and moderated in the future. Accordingly, the new rule set is generated in order to reduce the number of social mentions for review while accurately capturing social mentions likely to be moderated.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The terms "social networking service" and "social networking site" refer to any online presence at which a user may share comments with other users within a social network. For instance, this may include services, such as the TWITTER, FACEBOOK, LINKEDIN, TUMBLR, and YOUTUBE services, to name a few.

A "social analysis tool" refers to software that facilitates companies' analysis of social networks. Among other things, a social analysis tool may be used by a company to collect information from social networking services and to manage social content and messages using social network services.

A "capture rule" refers to criteria, such as text, phrases, and/or metadata, used to capture social data from social networking services that is provided to and/or displayed within a moderation tool as social mentions.

A "social mention" includes any social networking message that matches the criteria set forth by one or more capture rules. A social mention may include both the text of a social networking message and metadata associated with the message.

A "rule set" refers to a defined set of one or more captures rules used to capture social mentions from one or more identified social networking services.

A "moderation tool" refers to a component of a social analysis tool that receives social mentions captured using a capture rule and allows a moderator to review the social mentions and take moderation actions on the social mentions.

A "moderation action" refers to any action that may be taken for a social mention. This may include, for instance, responding to a social message (e.g., responding to a tweet from a consumer using the TWITTER service), resending a social message (e.g., retweeting a tweet), liking a social message, or reporting an author who repeatedly posts bad content as a spammer. In some instances, a moderation action may be an action internal to a company, such as flagging a social mention for escalation or review by another moderator within the company.

A "moderator" is a person who is responsible for reviewing social mentions for a company and deciding whether to take moderation actions on certain social mentions.

To assist companies in their social networking efforts, some social analysis tools, such as the ADOBE SOCIAL tool, have been developed that provide mechanisms for companies to collect information regarding what consumers are saying and manage responses to consumers' social networking messages. These social analysis tools allow companies to set rules for capturing social data from social networks. The captured social data may be provided by a social analysis tool as a list of social mentions that each may include the text of a social networking message and metadata associated with the message. A person (i.e., a moderator) may review each social mention and determine to take moderation actions on some of the social mentions, such as posting responses to the social networking messages. Often, a large number of social mentions are captured, but moderation actions are taken on a very small subset of those social mentions. Therefore, the rules are typically too broad, and a moderator has too much data to sift through to find the small subset of social mentions to take actions on.

Embodiments of the present invention are generally directed to improving capture rules in order to reduce the number of social mentions that need to be reviewed by a moderator while providing social mentions that are likely to be of interest to the company and moderated. This allows the moderation process to be more efficient and less time consuming. Generally, social mentions captured using an initial rule set are analyzed to identify common text and/or metadata from those social mentions. For instance, natural language processing and/or machine-learning algorithms may be employed to identify patterns in the text and/or metadata of the moderated social mentions. In some embodiments, the analysis may consider the capture rules of the initial rule set. For instance, the analysis may identify terms that commonly appear in social mentions with keywords from the capture rules of the initial rule set. A new rule set is defined with capture rules having criteria selected based on the common text and/or metadata identified from the analysis. The goal of the new rule set is to have the system collect social mentions that are a closer match to those the moderator wishes to act upon. Therefore, the analysis to generate the new rule set may select criteria to generate capture rules that will collect social mentions that match the topics actually interacted upon in the moderation system or are otherwise of interest to the company.

The new rule set may be generated by modifying the initial new set (e.g., modifying existing capture rules, adding new capture rules, and/or removing capture rules) or providing an entirely new set of capture rules. The new set may then be employed to capture new social data that provides a smaller set of social mentions that are more likely to be of interest to the company and moderated.

Accordingly, in one aspect, an embodiment of the present invention is directed to a non-transitory computer storage medium storing computer-useable instructions that, when used by one or more computing devices, cause the one or more computing devices to perform operations. The operations include analyzing text and/or metadata of social mentions captured using an initial rule set to identify commonalities within the text and/or metadata. The operations also include generating a new rule set having one or more capture rules with criteria selected based on the commonalities identified by analyzing the text and/or metadata of the social mentions. The operations further include applying the new capture rule set to capture new social mentions from one or more social networks.

In another embodiment of the invention, an aspect is directed to a computer-implemented method. The method includes analyzing, by a computing device, text and/or metadata of social mentions captured using an initial rule set to identify commonalities within the text and/or metadata. The method also includes generating a new rule set having one or more capture rules with criteria selected based on the commonalities identified by analyzing the text and/or metadata of the social mentions. The method further includes employing the new rule set to capture new social data from one or more social networks for presentation in a moderation user interface.

A further embodiment is directed to a computerized system comprising: one or more processors; and one or more computer storage media storing computer-useable instructions that, when used by the one or more processors, cause the one or more processors to: analyze social mentions captured using an initial rule set to identify text in the social mentions that commonly appears in association with a keyword specified by a capture rule from the initial rule set; generate a new rule set having one or more capture rules with criteria selected based on the text; and apply the new rule set to capture social mentions from one or more social networking services.

Figure 1:
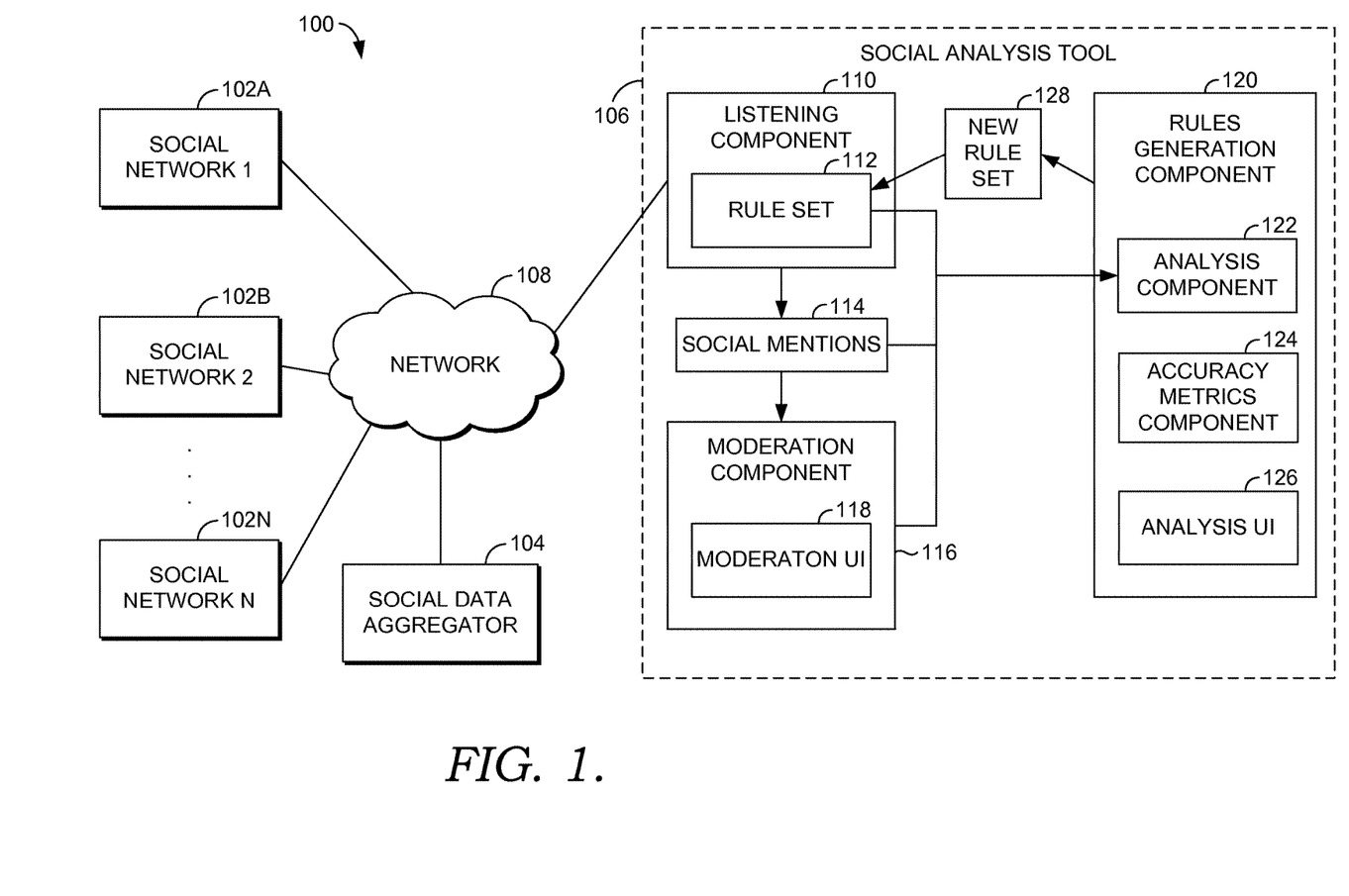
FIG. 1 is a block diagram of an exemplary system architecture in which embodiments of the invention may be employed.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a number of social networking services 102A, 102B, 102N, a social data aggregator 104, and a social analysis tool 106. It should be understood that the system 100 shown in FIG. 1 is an example of one suitable computing system architecture. Each of the components shown in FIG. 1 may be implemented via any type of computing device, such as computing device 100 described with reference to FIG. 1, for example. The components may communicate with each other via a network 108, which may include, without limitation, one or more local area networks (LANs) and/or wide area networks (WANs). Such networking environments are commonplace in offices, enterprise-wide computer networks, intranets, and the Internet. It should be understood that any number of social networking services, social data aggregators, and social analysis tools may be employed within the system 100 within the scope of the present invention. Each may comprise a single device or multiple devices cooperating in a distributed environment. For instance, the social analysis tool 106 may be provided via multiple devices arranged in a distributed environment that collectively provide the functionality described herein. Additionally, other components not shown may also be included within the network environment.

The social analysis tool 106 may be employed by a company to assist in managing the company's brand. Among other things, the social analysis tool 106 operates to collect social data from social networking services 102A, 102B, 102N. As represented in FIG. 1, social data may be collected from any number of social networking services. These services generally include any online presence at which users may share messages with other users within a social network of users. In some instances, the social analysis tool 106 may access social data directly from a social networking service or an entity providing the social analysis tool 106 may access the data from a social networking service and provide the data to the tool 106. For instance, a social networking service may provide APIs that expose the data. In other instances, the social analysis tool 106 may access social data from a third-party social data aggregator 104 (e.g., the GNIP service), which may operate to access data from one or more social networking services, standardize the data, and provide the standardized data. Any and all such variations are contemplated to be within the scope of embodiments of the present invention.

As shown in FIG. 1, the social analysis tool 106 includes, among other things not shown, a listening component 110, moderation component 118, and rules generation component 120. The listening component 110 includes a rule set 112. The rule set 112 includes one or more capture rules that set forth criteria used by the listening component 110 to identify particular social mentions to capture from the social data. The rule set 112 may include any number of capture rules. In some cases, a single capture rule could be used to capture social mentions. In other cases, multiple capture rules may be used with different criteria.

The rule set 112 may initially be defined by the company or on behalf of the company to satisfy whatever objectives the company may have. For instance, the company may generally define its objectives and an initial set of capture rules may be set based on those objectives. Generally, any aspect of social messages that may be of interest to a company may be included as criteria in a capture rule. The criteria may include specific terms or phrases included within social messages. For example, the terms may include the company's trademarks or terms relevant to the company's products, services, industry, or otherwise of interest to the company. The terms may be bare terms or may be terms associated with a hashtag or other term tagging mechanism employed by users. Any number of terms or phases may be included within the capture rules of the rule set 112.

The capture rules of the rule set 112 may also set forth metadata criteria. In particular, a variety of metadata may be associated with each social message. This may include, for instance, information regarding: the author of the social message (e.g., demographic information, name or other identification, location, language the author claims to speak, number of messages previously captured by the capture rules for the author, Klout score, number of followers, etc.); number of comments, retweets, or other messages from other users on the social message; social networking service on which the social message was posted; and day/time when the social message was posted. The capture rules of the rule set 112 may include criteria specifying different combinations of metadata.

The listening component 110 applies the capture rules of the rule set 112 to social data accessed from social networking services 102A, 102B, 102N and/or the social data aggregator 104 to identify social mentions 114 that satisfy the criteria set forth by the capture rules. The social mentions 114 captured by the listening component 110 are provided to the moderation component 116.

The moderation component 116 includes a moderation user interface (UI) 118. The moderation UI 118 may be employed by a moderator to review the social mentions 114 captured by the listening component 110. The moderator may then take moderation actions on some of the social mentions.

The rules generation component 120 generally operates to generate a new rule set 128 that improves upon the initial rule set 112 to thereby better identify social mentions that are more likely to be relevant to the company and also more likely to be moderated, thereby reducing the overall number of social mentions that need to be reviewed by a moderator. Although the rules generation component 120 is shown as part of the social analysis tool 106 in FIG. 1, it should be understood that the rule generation component 120 may be provided separate from a social analysis tool (e.g., as a stand-alone application or service) in other embodiments.

As shown in FIG. 1, the rules generation component 120 includes an analysis component 122 that analyzes social mentions 114 captured using the rule set 112. The analysis component 122 may also consider the capture rules of the rule set 112 to inform the analysis. The analysis component 122 may further consider data regarding moderation actions taken on the social mentions 114 using the moderation component 116. The new rule set 128 may be generated by either modifying the existing rule set 112 (e.g., by modifying existing capture rules of the rule set 112, adding new capture rules to the rule set 112, and/or removing capture rules from the rule set 112) or replacing the rule set 112 with an entirely new set of capture rules.

The analysis component 122 may analyze information from social mentions 114 captured using the rule set 112. More particularly, the analysis component 122 may analyze aspects of the social mentions 114, such as, for instance, the text of the social mentions 114 and/or metadata associated with the social mentions 114. The metadata may include, by way of example only and not limitation, information regarding: the author of the social message (e.g., demographic information, name or other identification, location, language the author claims to speak, number of messages previously captured for the author, Klout score, number of followers, etc.); number of comments, retweets, or other messages from other users on the social message; social networking service on which the social message was posted; day/time when the social message was posted, criteria from a capture rule the social message satisfied, and scores/rankings applied to the social message (e.g., a sentiment score or emotion score or other metadata that reflects the user's sentiment or emotions connected with the message—positive, negative, happy, angry, sad, etc.).

The analysis component 122 may analyze the data associated with the social mentions 114 to identify commonalities among them. This allows the analysis component 122 to identify what aspects of the social mentions 114 are in common and are therefore aspects that may be of more interest to the company. In some embodiments, natural language processing and/or machine-learning algorithms may be employed to identify patterns in the text and/or metadata of the social mentions 114. For instance, topical analysis may be performed on the text of the social mentions 114 to identify common topics. In some instances, the analysis may result in a single capture rule being generated based on text and/or metadata common to the moderated social mentions. In other instance, this may result in multiple capture rules being generated.

In some instances, the capture rules of the rule set 112 may be used to inform the analysis of the social mentions 114. For example, the rule set 112 may include a capture rule in which social messages that contain a particular keyword are captured. The analysis component 122 may analyze the social mentions to identify other words that are commonly used in conjunction with the keyword in the text of the social mentions 114. In some instances, this could include a topical analysis to identify topics discussed in the capture social mentions 114 in conjunction with the keyword. In other instances, this could include examining bigrams, trigrams, etc. that include the keyword. By way of example to illustrate, suppose the rule set 112 consists of a single capture rule to capture social messages that include the keyword "movie." Analysis of the captured social mentions 114 based on the keyword "movie" could result in the identification of a specific movie title and release date. As such, new capture rules could be created that include the specific movie title and/or the release date as criteria.

The rules generation component 120 may also include an accuracy metrics component 124 configured to generate accuracy metrics for a new rule set generated by the analysis component 122. For instance, one accuracy metric may generally reflect the ability of the new rule set 128 to reduce the number of social mentions captured. This accuracy metric may be determined by applying the new rule set 128 to previously captured social mentions and comparing the number of social mentions satisfying the criteria of the new rule set 128 with the number of social mentions captured using the initial rule set 112. Another accuracy metric may indicate the effectiveness of the new rule set 128 in capturing social mentions that are likely to be moderated. The effectiveness of the new rule set 128 in capturing social mentions likely to be moderated may be estimated by identifying the percentage of previously moderated social mentions that satisfy the criteria of the new rule set 128.

As a specific example to illustrate the accuracy metrics, suppose an initial rule set resulted in capturing 1000 social mentions and 100 of those social mentions were moderated. Suppose also that applying a new rule set to the 1000 social mentions results in only 700 of the 1000 social mentions meeting the criteria of the new rule set. Accordingly, the new rule set would be expected to reduce the number of social mentions captured by 30%. Suppose further that the 700 social mentions meeting the criteria of the new rule set include 99 of the 100 moderated social mentions. Accordingly, the new rule set would be expected to capture 99% of the social mentions likely to be moderated.

The accuracy metrics calculated by the accuracy metrics component 124 may be presented to a user (e.g., a person in charge of the company's social networking review/moderation program) in conjunction with the new rule set 128. This may allow the user to decide whether or not to implement the new rule set 128 based on whether the trade-off of reduced social mentions to review justifies the likelihood of missing some social mentions that should be moderated. For example, if the accuracy metrics indicate the new rule set 128 is expected to provide 25% less social mentions while capturing 99% of social mentions likely requiring moderation, the user may decide that the new rule set 128 should be implemented. However, if the accuracy metrics indicate the new rule set 128 will reduce the number of social mentions by 15% while only capturing 90% of social mentions likely requiring moderation, the user may decide to not implement the new rule set 128.

An analysis UI 126 may be provided that presents the new rule set 128 and/or accuracy metrics to a user. This allows the user to review details of the new rule set 128 and/or accuracy metrics and make a determination regarding whether to implement the new rule set 128. For instance, the analysis UI 126 may provide a control that allows the user to accept the new rule set 128 for implementation or to reject the new rule set 128.

In some embodiments, the analysis UI 126 may be configured to allow the user to make manual changes to the new rule set 128. For instance, the analysis UI 126 may present details of the new rule set 128, including the various criteria included in the capture rules of the new rule set 128. The user may view the criteria and make changes if desired. Any changes made by the user may be applied to the new rule set 128.

Additionally, the accuracy metrics component 124 may calculate new accuracy metrics based on any user changes to the new rule set 128, and the new accuracy metrics may be presented to the user. This allows the user to make changes to the new rule set 128 and see how the changes affect the capture of social mentions. As such, the user can make different changes until desired accuracy metrics are achieved, and then the user may decide to implement the new rule set 128 with the user's changes.

In further instances, the analysis component UI 126 may allow the user to specify desired accuracy metrics. The analysis component 122 and accuracy metrics component 124 may then operate to generate the new rule set 128 that satisfies the specified accuracy metrics. This would prevent the user from having to manually make changes until desired accuracy metrics are met.

Figure 2:
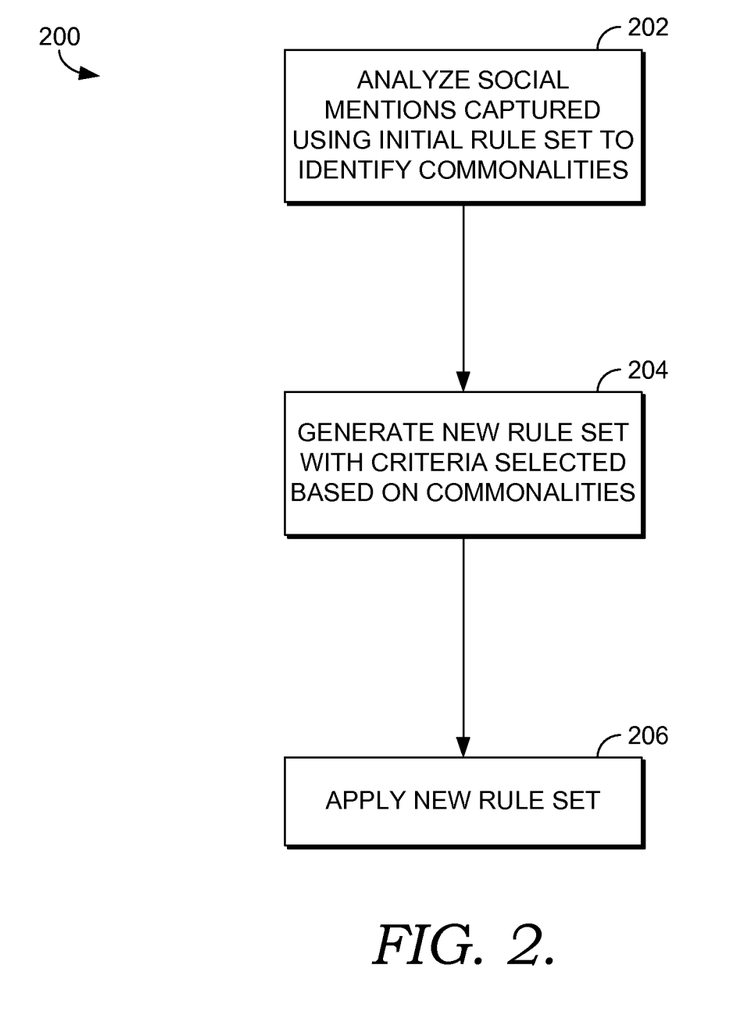
FIG. 2 is a flow diagram showing a method for analyzing moderation data to generate new capture rules in accordance with an embodiment of the present invention.

Turning now to FIG. 2, a flow diagram is provided that illustrates a method 200 for analyzing social mentions captured using an initial rule set to generate a new rule set. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a social analysis tool, such as the ADOBE SOCIAL tool.

As shown at block 202, data regarding social mentions captured using an initial rule set is analyzed (for instance, by the analysis component 122 of FIG. 1). The analysis of captured social mentions at block 202 may include analyzing text and/or metadata of social mentions captured using the initial rule set to identify commonalities among those social mentions, such as common words or phrases contained in the text of the capture social mentions and/or common metadata attributes of the capture social mentions. The analysis may employ natural language processing and/or machine learning techniques to analyze the captured social mentions and identify commonalities. In some instances, criteria of capture rules of the initial rule set may be considered as part of the analysis. For instance, the analysis may identify topics and/or terms/phrases that are common in the capture social mentions in conjunction with keywords specified in the initial rule set. Moderation data regarding captured social mentions that were moderated may also be considered as part of the analysis.

A new rule set is generated based on the analysis (for instance, by the analysis component 122 of FIG. 1), as shown at block 204. The new rule set may include one or more capture rules with criteria selected based on the analysis to better capture social mentions that are more likely to be of interest to the company and more likely to be moderated. As a result, the new rule set will reduce the number of social mentions that will be captured and need to be reviewed by a moderator. In some instances, the new rule set may be generated by modifying the initial rule set (e.g., by modifying existing capture rules of the initial rule set, adding new captures rules to the initial rule set, and/or removing capture rules from the initial rule set). In some instances, the new rule set may be generated by providing an entirely new rule set independent of the initial rule set.

The new rule set is applied for the purpose of capturing new social data, as shown at block 206. For instance, the analysis component 122 of FIG. 1 may update the rule set of the listening component 110, which may capture new social data using the new rule set. In some instances, the new rule set may be applied automatically by the system. In other instances, the new rule set may be presented to a user, who may decide whether to apply the new rule set. Additionally, in some instances, the user may be given the ability to modify the new rule set before applying the new rule set to capture new social data.

It should be understood that in some embodiments, the process of analyzing captured social mentions may be repeated after applying a new rule set to update and continuously improve the rule set used by the system.

Figure 3:
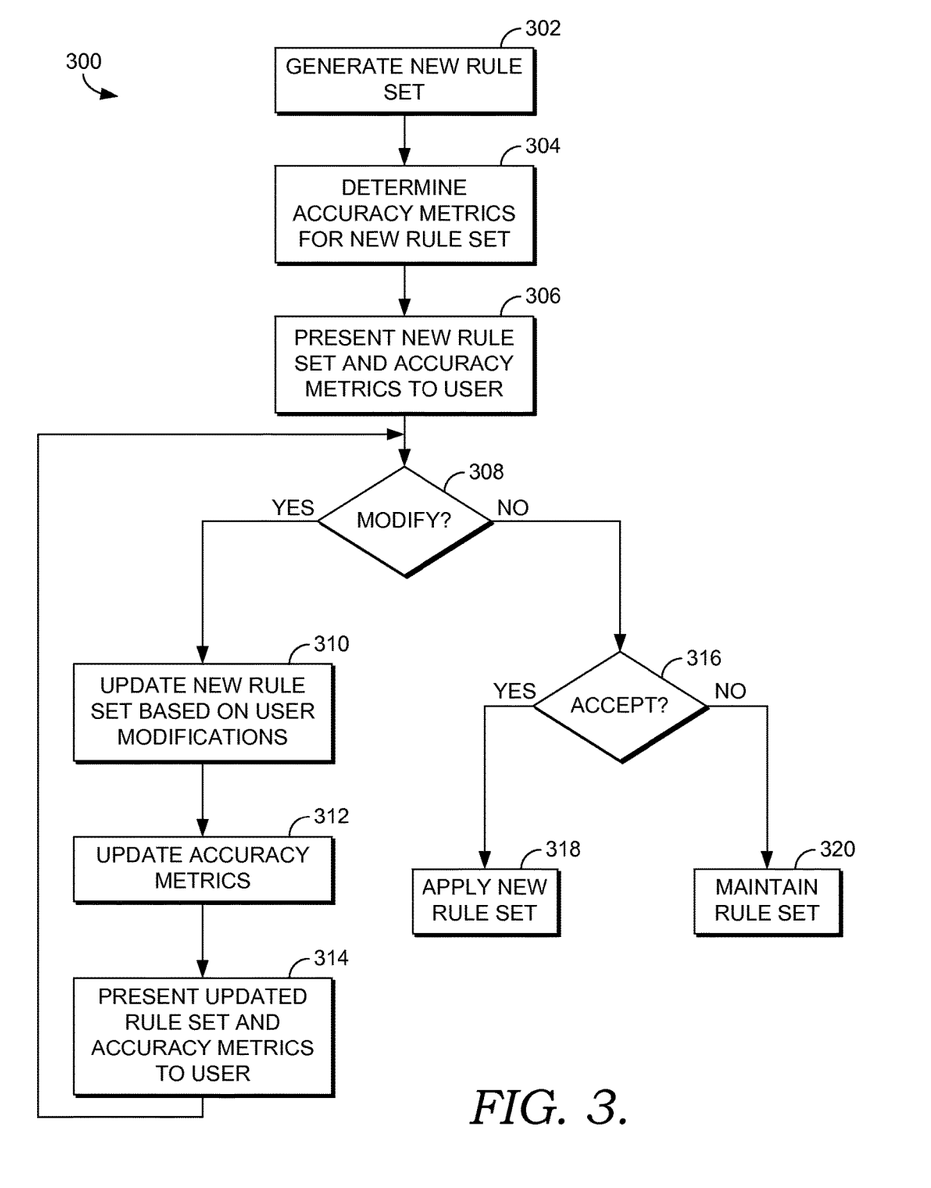
FIG. 3 is a flow diagram showing a method for providing accuracy metrics in conjunction with new capture rules and allowing a user to modify and/or accept the new rules in accordance with an embodiment of the present invention.

Turning now to FIG. 3, a flow diagram is provided that illustrates a method 300 for providing accuracy metrics in conjunction with a new rule set for capturing social mentions and allowing a user to modify and/or accept the new rule set. Initially, as shown at block 302, a new rule set is generated (for instance, using the analysis component 122 of FIG. 1). This may be performed, for instance, by analyzing social mentions captured using an initial rule set and/or capture rules of the initial rule set.

Accuracy metrics are determined for the new rule set at block 304, for instance, by the accuracy metrics component 124 of FIG. 1. As discussed previously, one accuracy metric may generally reflect the ability of the new rule set to reduce the number of social mentions captured. This accuracy metric may be determined by determining the number or percentage of social mentions captured using the previous rule that satisfy the capture rules of the new rule set. Another accuracy metric may indicate the effectiveness of the new rule set in capturing social mentions that are likely to be moderated. The effectiveness of the new rule set in capturing social mentions likely to be moderated may be estimated by identifying the number or percentage of previously moderated social mentions that satisfy the capture rules of the new rule set.

The new rule set and accuracy metrics are presented to a user (for instance, by the analysis UI 126 of FIG. 1), as shown at block 306. The user may be a moderator or an administrator responsible for coordinating the social analysis program for a company. The user may review details of the new rule set, including the criteria of the new rule set, and the accuracy metrics associated with the new rule set.

In some instances, the user may decide to make changes to the new rule set. For instance, the user may add, remove, or change criteria of the new rule set. Accordingly, a determination is made at block 308 (for instance, by the analysis UI 126 of FIG. 1) regarding whether a user change to the new rule set has been received. If a user change has been received, the criteria of the new rule set is updated based on the user change (for instance, by the analysis component 122 of FIG. 1), as shown at block 310. Additionally, the accuracy metrics are updated in accordance with the updated rule set (for instance, by the accuracy metrics component 124 of FIG. 1), as shown at block 312. The updated rule set and updated accuracy metrics are displayed to the user (for instance by the analysis UI 126 of FIG. 1), as shown at block 314. As such, the user can review details of the updated rule set and the corresponding accuracy metrics to determine if additional changes are warranted. If so, the process of updating the rule set and accuracy metrics at blocks 310, 312, and 314 is repeated.

If the user is done making changes or if no changes are made, the user may decide to accept the new/updated rule set. Accordingly, a determination is made regarding whether the user has accepted the new/updated rule set (for instance, by the analysis UI 126 of FIG. 1), as shown at block 316. If so, the new/updated rule set is applied, as shown at block 318. For instance, the analysis component 122 of FIG. 1 may update the listening component 110 with the new rule set. The new rule set may be applied in some embodiments by modifying the previous rule set. In other embodiments, the new rule set may be applied by removing the previous rule set. This may include disabling the previous rule set and replacing it with the new rule set.

Alternatively, if the user decides not to accept the rule set, the existing rule set is maintained and the new rule set may be discarded, as shown at block 320.

Figure 4:
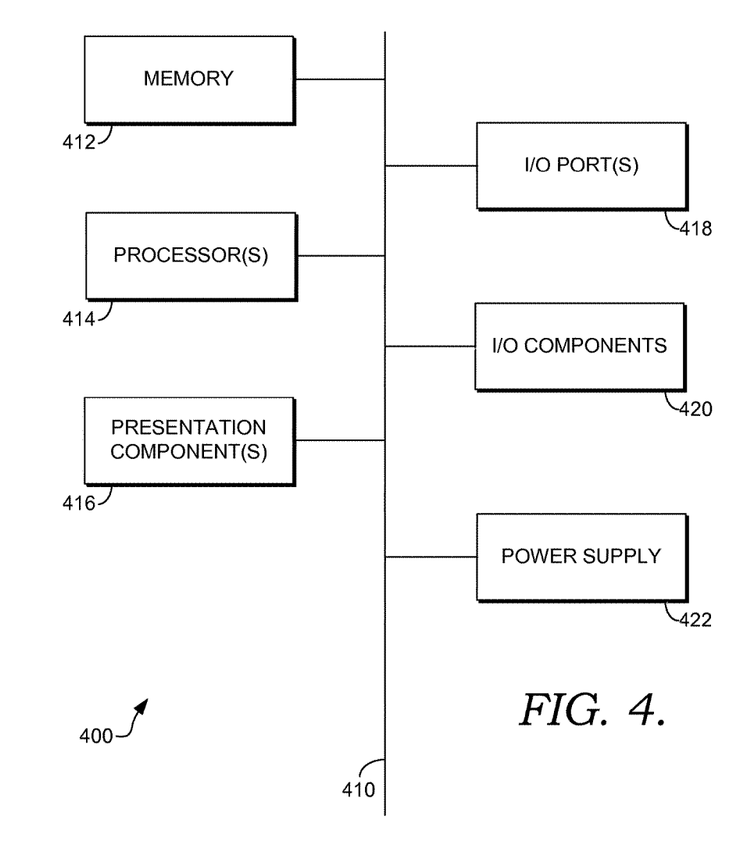
FIG. 4 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

As can be understood, embodiments of the present invention provide for, among other things, analysis of social mentions captured using a rule set to improve the rule set. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   analyzing text and/or metadata of social mentions previously captured using an initial rule set to identify commonalities within the text and/or metadata, the social mentions having been previously captured for moderation purposes in which moderation actions are taken on certain ones of the social mentions associated with a company to manage the company's brand;
   selecting criteria corresponding to the commonalities identified by analyzing the text and/or metadata of the social mentions;
   generating an improved rule set having one or more capture rules by modifying a capture rule of the initial rule set or by adding a new capture rule to the initial rule set, the modified capture rule or added new capture rule including the criteria corresponding to the commonalities;
   calculating one or more accuracy metrics for the one or more capture rules, wherein the one or more accuracy metrics indicate an effectiveness of the improved rule set in capturing social mentions likely to be moderated, the effectiveness determined by identifying a percentage of previously moderated social mentions that satisfies the criteria of the improved rule set; and
   applying the improved rule set to capture new social mentions from one or more social networks.

2. The non-transitory computer storage medium of claim 1, wherein the text of the social mentions captured using the initial rule set is analyzed using natural language processing.

3. The non-transitory computer storage medium of claim 1, wherein the text of the social mentions captured using the initial rule set is analyzed based on a keyword specified by an initial capture rule of the initial rule set to identify one or more terms commonly used in conjunction with the keyword.

4. The non-transitory computer storage medium of claim 1, wherein the text of the social mentions captured using the initial rule set is analyzed based on a keyword specified by an initial capture rule of the initial rule set to identify one or more common topics corresponding with the keyword.

5. The non-transitory computer storage medium of claim 1, wherein generating the improved rule set comprises:
   generating one or more proposed capture rules for the improved rule set based on the commonalities;
   providing the one or more proposed capture rules for presentation to the user;
   receiving an acceptance of the one or more proposed capture rules from the user; and
   generating the improved rule set using the one or more proposed capture rules based on the acceptance.

6. The non-transitory computer storage medium of claim 5, further comprising providing the one or more accuracy metrics for presentation with the one or more proposed capture rules.

7. The non-transitory computer storage medium of claim 5, wherein generating the improved rule set further comprises receiving a user modification to at least one of the one or more proposed capture rules prior to acceptance of the one or more proposed capture rules.

8. The non-transitory computer storage medium of claim 1, further comprising:
   providing the criteria corresponding to the commonalities to a user; and
   receiving a user selection from the criteria provided to the user, wherein selecting the criteria corresponding to the commonalities identified by analyzing the text and/or metadata of the social mentions is based at least in part on the user selection.

9. The non-transitory computer storage medium of claim 8, further comprising:
   based selecting the criteria corresponding to the commonalities, calculating one or more accuracy metrics for the improved rule set; and
   receiving an acceptance of the improved rule based a least in part on the one or more accuracy metrics.

10. A computer-implemented method comprising:
    analyzing, by a computing device, text and/or metadata of social mentions previously captured using an initial rule set to identify commonalities within the text and/or metadata, the social mentions having been previously captured for moderation purposes in which moderation actions are taken on certain ones of the social mentions associated with a company to manage the company's brand;
    determining criteria corresponding to the commonalities identified by analyzing the text and/or metadata of the social mentions;
    receiving a specified accuracy metric for an improved rule set, the specified accuracy metric indicating an effectiveness of the improved rule set in capturing social mentions likely to be moderated, the effectiveness determined by identifying a percentage of previously moderated social mentions that satisfies the criteria of the improved rule set;
    based on the specified accuracy metric, selecting criteria from the determined criteria corresponding to the commonalities;
    generating the improved rule set having one or more capture rules based on the initial rule set and the selected criteria, wherein the improved rule set satisfies the specified accuracy metric; and
    employing the improved rule set to capture new social data from one or more social networks for presentation in a moderation user interface.

11. The computer-implemented method of claim 10, wherein the text of the social mentions captured using the initial rule set is analyzed using natural language processing.

12. The computer-implemented method of claim 10, wherein the text of the social mentions captured using the initial rule set is analyzed based on a keyword specified by an initial capture rule of the initial rule set to identify one or more terms commonly used in conjunction with the keyword.

13. The computer-implemented method of claim 10, wherein the text of the social mentions captured using the initial rule set is analyzed based on a keyword specified by an initial capture rule of the initial rule set to identify one or more common topics corresponding with the keyword.

14. The computer-implemented method of claim 10, wherein the improved rule set is generated by modifying the initial rule set.

15. The computer-implemented method of claim 10, wherein the improved rule set is generated by generating a new set of one or more capture rules.

16. The computer-implemented method of claim 10, wherein generating the improved rule set comprises:
    generating one or more proposed capture rules for the improved rule set based on the commonalities;
    providing the one or more proposed capture rules for presentation to a user;
    receiving an acceptance of the one or more proposed capture rules from the user; and
    generating the improved rule set using the one or more proposed capture rules based on the acceptance.

17. The computer-implemented method of claim 16, wherein generating the improved rule set further comprises providing the one or more accuracy metrics for presentation with the one or more proposed capture rules.

18. The computer-implemented method of claim 16, wherein generating the improved rule set further comprises receiving a user modification to at least one of the one or more proposed capture rules prior to acceptance of the one or more proposed capture rules.

19. A computerized system comprising:
    one or more processors; and
    one or more computer storage media storing computer-useable instructions that, when used by the one or more processors, cause the one or more processors to:
    analyze social mentions previously captured using an initial rule set to identify text in the social mentions that commonly appears in association with a keyword specified by a capture rule from the initial rule set, the social mentions having been previously captured for moderation purposes in which moderation actions are taken on certain ones of the social mentions associated with a company to manage the company's brand;
    select criteria based on the text identified by analyzing the social mentions;
    generate an improved rule set having one or more capture rules based on the initial rule set and the criteria selected based on the text, wherein the improved rule set is generated by modifying at least one rule of the initial rule set with the selected criteria;
    calculating one or more accuracy metrics for the one or more capture rules, wherein the one or more accuracy metrics indicate an effectiveness of the improved rule set in capturing social mentions likely to be moderated, the effectiveness determined by identifying a percentage of previously moderated social mentions that satisfies the criteria of the improved rule set; and
    apply the improved rule set to capture social mentions from one or more social networking services.

* * * * *